Aug. 16, 1938.   F. A. MUTCHLER, SR   2,127,044
DROP-FLUSH CHOCK
Filed Oct. 16, 1937
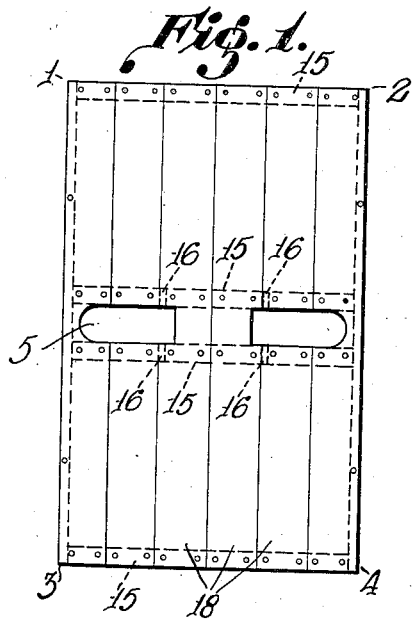
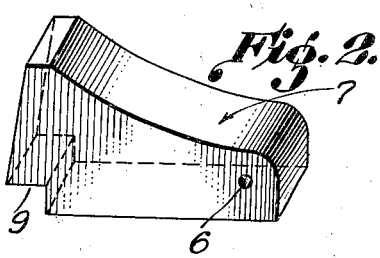
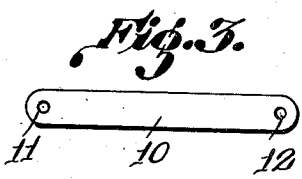
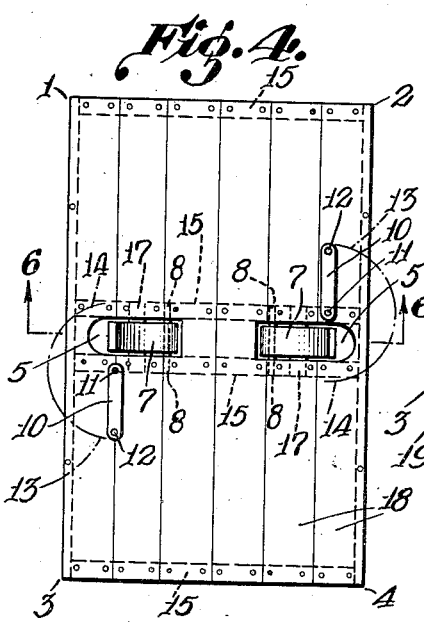
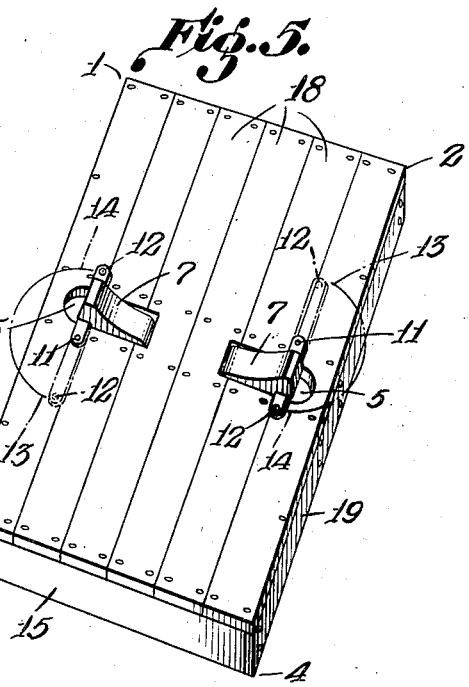
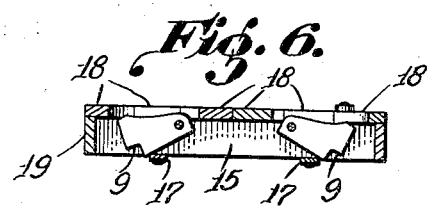
Inventor:
Frank A. Mutchler, Sr.

Patented Aug. 16, 1938

2,127,044

UNITED STATES PATENT OFFICE 2,127,044

DROP-FLUSH CHOCK

Frank A. Mutchler, Sr., Bayonne, N. J.

Application October 16, 1937, Serial No. 169,401

4 Claims. (Cl. 280—179)

The invention relates to loading devices, and it has particular relation to devices for loading heavy cylindrical articles (rolling freight) on trailers (flat trucks), or the like for movement purposes, to or from freight cars, or about warehouses and industries, or the like.

One object of the invention is to provide a trailer loading device which may be secured to crosspieces extending under the floor of a trailer, or the like and be accessible through an opening in the floor.

Another object of the invention is to provide a trailer loading device secured to crosspieces under the floor, and accessible through an opening therein, and which may be disposed of in the floor, in an out-of-the-way position, when it is not in use, or when it may be desired to roll a cylindrical article across the device. In this connection, it may be stated, that it is desired to employ a device in the opening in the floor to present a flush floor surface when the trailer loading device is not in use, or when it may be desired to roll a cylindrical article across the device.

Another object of the invention is to provide a floor construction in combination with a trailer loading device, in which construction an opening is provided for installing the trailer loading device, to which access may be had by means of an opening in the floor, to permit drawing the trailer loading device through such opening, when it is desired to use it for loading a cylindrical article on the trailer.

Another object of the invention is to provide a trailer loading device which can be installed in a permanent or in a portable floor, which may be placed on top of the permanent floor if it is desired to obtain a higher elevation.

Another object of the invention is to provide a receptacle below the surface of the floor, between crosspieces under the floor, and to which the trailer loading device is secured.

And in general, it is the object of the invention to provide anchoring and receptacle means, which preferably comprises ordinary crosspieces, employed for supporting the floor, located at the opposing sides of the opening, below the surface of the permanent or of the portable floor, and which is accessible through the opening in the floor, permitting the drawing of the loading device above the floor where it is to be used.

Other objects of the invention will be apparent from the following description, the drawing relating thereto, and the claims hereinafter set forth.

For a better understanding of the description of the invention, reference may be had to the accompanying drawing forming a part of this specification, wherein:

Figure 1 is a surface view of a portable floor of a trailer, illustrating an arrangement of the trailer loading device according to one form of the invention.

Figure 2 is a perspective view of a chock.

Figure 3 is a view of a steel support plate.

Fig. 4 is a plan view illustrating the chocks in the receptacles 5, in a position flush with the floor.

Figure 5 is a perspective view illustrating the chocks in the operative position.

Figure 6 is a vertical transverse section along the line 6—6 of Figure 4.

In referring to Figure 1, numerals 1, 2, 3 and 4 indicate the surface of a portable floor, which is constructed of one-inch floor-boards 18 fastened on 2"x4" wooden crosspieces 15, one at each end, and one at each side of the opening, with facing 19 on the sides, as shown in Figure 5, 2—4, 3—4. Almost invariably trailers are constructed with wooden floors, the dimensions of which are 3'x6', although the frame work of the trailers may be constructed of steel. Numeral 5 indicates the receptacles in the floor, located at the middle of the longitudinal dimension of the floor, 4 inches apart, in each of which a chock 7 (Figure 2) is secured. The receptacles are two inches longer than the chock and semi-circular in shape at the outer end, to provide space for the hand to draw the chock above the floor. Numeral 16 indicates holes in the crosspieces to insert the ends of the iron pin or axle 8.

In Figure 2, numeral 7 indicates the chock, which has a concave top to co-ordinate with the cylindrical article. Numeral 8 represents an iron pin or axle which passes through the hole 6 in the chock 7, and is inserted in the holes 16 in receptacle 5 (Figure 1), to anchor chock 7. Numeral 9 is a groove across one end of chock 7, into which groove plate 10 (Figure 3) is moved to hold chock 7 in a position above the floor (Figure 5).

In Figure 3, numeral 10 is a steel support plate, 11 and 12 are counter-sunk holes. Support plate 10 is held in place by a flat-head screw through 11, screwed into the wooden floor at the side of receptacle 5, near the semi-circular shaped end (Figure 4). A screw may be used through 12, if it is desired to hold one chock 7 (Figure 5) permanently in a position above the floor.

In Figure 4, numeral 7 indicates chocks (Figure 2) anchored in the receptacles 5, flush with the floor, permitting cylindrical article to be rolled on or off the floor. When the chock is drawn to a position above the floor, support plate 10, end 12, is moved in a semi-circular direction around the end of the receptacle 5, to position 14, bringing support plate 10 into groove 9 (Figure 2), thereby holding chock 7 in a position above the floor as shown in Figure 5. 15 is a crosspiece; 6 is a hole through the chock 7, through which, the iron pin or axle 8 penetrates the crosspieces 15 at the anchoring base 16, thereby providing anchoring means; 17 is a strip across the receptacle 5 to prevent the chock from hanging below the crosspieces; 18 is the floor and 19 is the ¾" facing.

In Figure 5, numeral 7 indicates chock (Figure 2) in a position above the floor, thereby preventing cylindrical article from rolling off the floor. When the support plate 10 is moved from the position shown in Figure 5, by moving end 12 in a semi-circular direction around the end of receptacle 5, to position 13, chock 7 automatically drops to a position flush with the floor, as shown in Figure 4.

Particularly, it will be apparent, that the means provided for storing and anchoring such a loading device comprises crosspieces forming a part of the trailer construction, and hence, the device may be associated with the trailer with but little additional expense. It is apparent that a trailer loading device, so anchored to crosspieces of a trailer, will have a firm and rigid anchoring base, which will relieve the wooden floor of any stress that might otherwise be imparted to it if the loading device were anchored directly thereto. By using a receptacle having its lower side closed, either partly or throughout its length, it is obvious that the device connected to the crosspieces will not hang below the crosspieces when disposed of below the surface of the trailer floor, and that the device will always be in a position where it can be reached through the opening in the wooden floor. In this connection, it may be stated, that when a portable floor is used on top of the permanent floor, to obtain a higher elevation, or to provide for clearance over coupling devices attached to trailers when they extend above the surface of the permanent floor, or to maintain a tight and smooth surface floor, or for any other use, the permanent floor of the trailer forms the lower side of the receptacle; but when the device is installed in the permanent floor, an iron plate 17 is fastened to the under side of the crosspieces, thereby forming the lower side of the receptacle, either partly or throughout its length. It is obvious, that by this means, the device connected to the crosspieces will not hang below the crosspieces when disposed of below the surface of the floor, and that the device will always be in a position where it can be reached through the opening in the floor.

Even though more than one form of the invention has been described and shown in detail, it will be apparent that various modifications may be made without departing from the scope of the appended claims.

I claim:

1. In combination, with a trailer (flat truck) floor or the like having an opening therein, two crosspieces extending under the floor and adjacent to two opposing sides of the opening, an anchoring means in the two crosspieces, an anchoring member extending transversely between the crosspieces, the ends penetrating the anchoring means in the crosspieces, a loading device attached thereto, between the two crosspieces and below the surface of the floor, and a steel plate one end of which is connected to the floor near the side of the opening at the outer end, and which turns on a fixed pivot whereby said plate may be moved circularly in either direction and co-ordinate with a groove on the end of loading device when it is above the surface of the floor.

2. In combination, with a trailer (flat truck) floor or the like having an opening therein, two crosspieces extending under the floor and adjacent to two opposing sides of the opening, a loading device anchored to the crosspieces and so arranged that one end of the device may be drawn through the opening and above the trailer floor, and a steel plate having one end anchored to the floor by means of a fixed pivot on which it can be moved circularly in either direction and co-ordinating with a groove in one end of the chock, thereby supporting the same above the surface of the floor to engage a cylindrical article and to resist pressure therefrom on the concave face of the chock.

3. In combination, with a trailer (flat truck) floor or the like having an opening therein, two crosspieces extending under the floor and adjacent to two opposing sides of the opening therein, an anchoring means in each of the two crosspieces, a chock with an anchoring member passing through the hole in the chock near one of the ends and projecting from the sides of the same and extending transversely between the crosspieces and penetrating the anchoring means in the crosspieces, thereby holding one end of the chock on a pin or axle between the crosspieces and below the surface of the floor, where it is accessible to be drawn above the surface of the floor when it is used, and a steel plate connected at one end to the floor of a trailer by a fixed pivot, whereby it may be moved circularly in either direction, and co-ordinating with a groove in the free end of the chock, thereby supporting the same above the surface of the floor to engage a cylindrical article and to resist pressure on the concave face of the chock induced by a cylindrical article having a tendency of crosswise movement on the trailer during transportation, and the adaptability of such loading devices to be installed and operative in either side or in both sides of a portable or permanent floor of a trailer or the like.

4. In combination, with a portable floor or the like, having crosspieces, one at each end, and one at each side of an opening, a chock installed therein, with anchoring means in crosspieces at the two opposing sides of an opening, an anchoring member passing through the hole in the chock near one end and projecting from the sides of the same and extending transversely between two crosspieces and penetrating the anchoring means, and a steel plate connected at one end to the portable floor by a fixed pivot whereby it may be moved circularly in either direction and co-ordinate with a groove in the free end of the chock, thereby supporting the same above the surface of the portable floor to engage a cylindrical article.

FRANK A. MUTCHLER, Sr.